US012598572B2

(12) United States Patent
Dash et al.

(10) Patent No.: US 12,598,572 B2
(45) Date of Patent: Apr. 7, 2026

(54) DYNAMIC MULTIMEDIA PRIORITY SERVICE (MPS) AND MISSION CRITICAL SERVICE (MCS) ACCESS IDENTITY SETTING

(71) Applicant: Apple Inc., Cupertino, CA (US)

(72) Inventors: Deepak Dash, Bangalore (IN); Nitin Kuppelur, Bangalore (IN); Vivek G. Gupta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 547 days.

(21) Appl. No.: 17/895,900

(22) Filed: Aug. 25, 2022

(65) Prior Publication Data
US 2023/0083595 A1 Mar. 16, 2023

Related U.S. Application Data

(60) Provisional application No. 63/243,523, filed on Sep. 13, 2021.

(51) Int. Cl.
| | |
|---|---|
| *H04W 76/00* | (2018.01) |
| *H04W 60/00* | (2009.01) |
| *H04W 76/15* | (2018.01) |
| *H04W 76/25* | (2018.01) |

(52) U.S. Cl.
CPC ........... *H04W 60/00* (2013.01); *H04W 76/15* (2018.02); *H04W 76/25* (2018.02)

(58) Field of Classification Search
CPC . H04W 60/00; H04W 74/0833; H04W 76/15; H04W 76/25; H04W 76/16; H04L 65/1073; H04L 65/403
See application file for complete search history.

(56) References Cited

U.S. PATENT DOCUMENTS

| | | | |
|---|---|---|---|
| 2019/0223070 A1* | 7/2019 | Lu ....................... | H04W 36/304 |
| 2019/0230585 A1* | 7/2019 | Chun .................... | H04L 63/102 |
| 2022/0104164 A1* | 3/2022 | Kedalagudde .......... | H04W 8/12 |
| 2022/0338154 A1* | 10/2022 | Niemi ................... | H04W 60/04 |
| 2022/0408498 A1* | 12/2022 | Cheng ................. | H04W 74/002 |

OTHER PUBLICATIONS

3GPP (3GPP TS 22.261v16.2.0, "Service Requirements for the 5G System"; Stage 1(Release 16) (hereafter 3GPP), Dec. 2017).*

* cited by examiner

*Primary Examiner* — Lakeram Jangbahadur
(74) *Attorney, Agent, or Firm* — Kubota & Basol LLP

(57) ABSTRACT
Methods and apparatuses for dynamically enabling and disabling one or more of a multimedia priority service (MPS) and a mission critical service (MCS) are disclosed. In some embodiments, a user equipment device (UE) comprises: at least one antenna; at least one radio coupled to at least one antenna, wherein at least one radio is configured to perform cellular communication; and one or more processors coupled to the at least one radio, wherein the one or more processors and at least one radio are configured to dynamically enable and disable use of a service from a group of services that includes a MPS and MCS.

16 Claims, 9 Drawing Sheets

Configure the UE (e.g., baseband processor) to use a multimedia priority service (MPS) and/or a
mission critical service (MCS) or setting an indicator set indicating access identify
for MPS/MCS is valid
(701)

Determine to use MPS/MCS
(702)

Dynamically enable and/or disable use of MPS/MCS
(703)

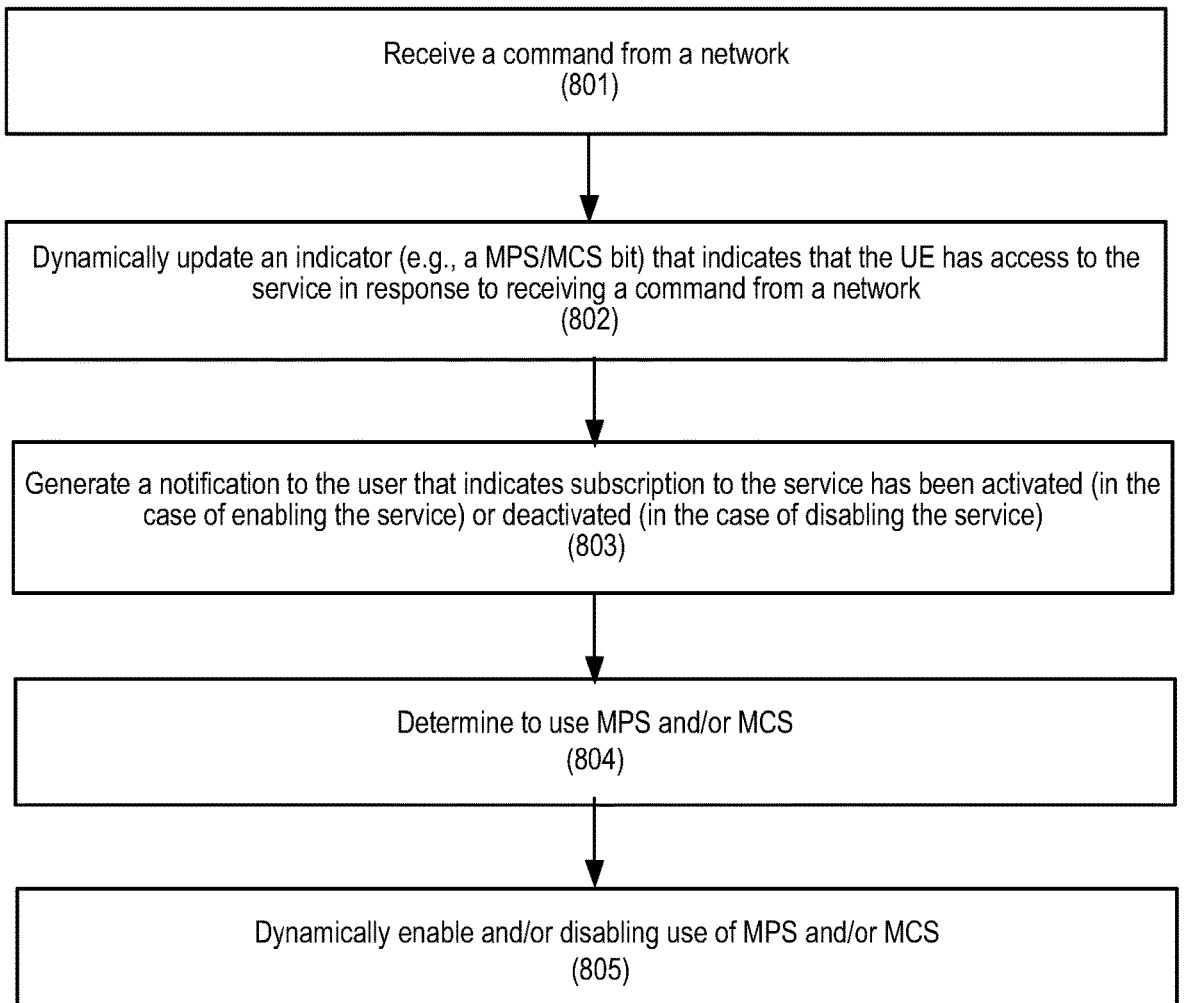

Receive a command from a network
(801)

Dynamically update an indicator (e.g., a MPS/MCS bit) that indicates that the UE has access to the service in response to receiving a command from a network
(802)

Generate a notification to the user that indicates subscription to the service has been activated (in the case of enabling the service) or deactivated (in the case of disabling the service)
(803)

Determine to use MPS and/or MCS
(804)

Dynamically enable and/or disabling use of MPS and/or MCS
(805)

*Fig. 8*

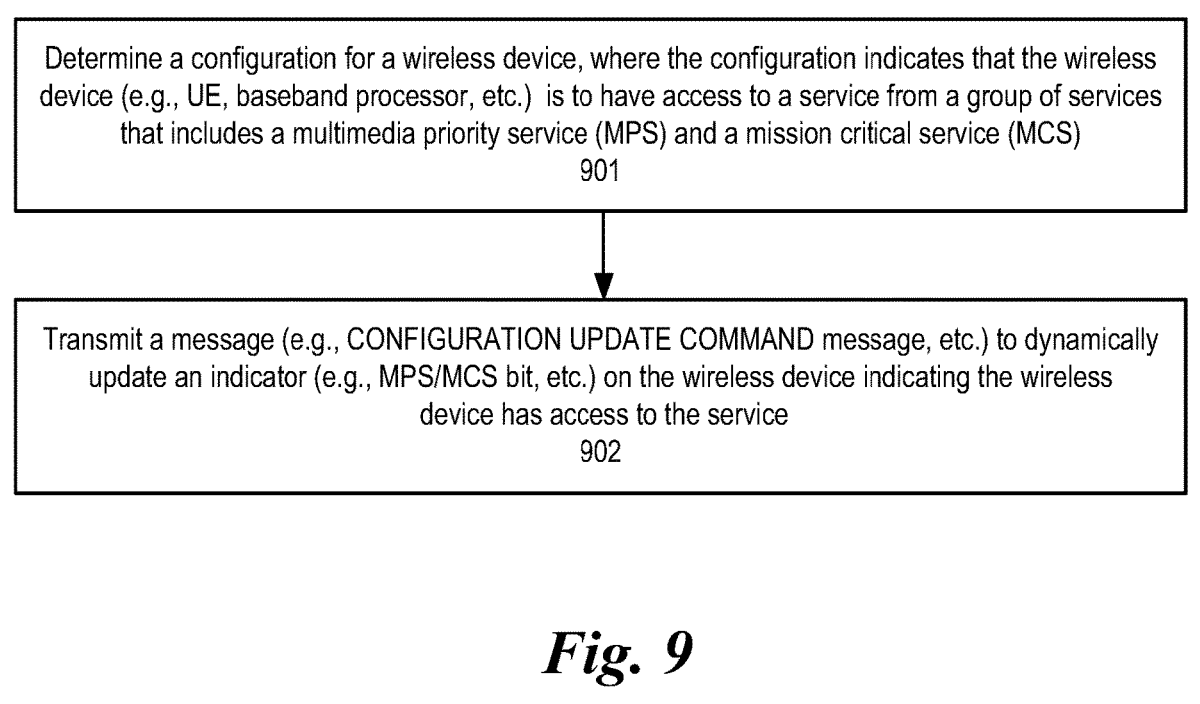

Determine a configuration for a wireless device, where the configuration indicates that the wireless device (e.g., UE, baseband processor, etc.) is to have access to a service from a group of services that includes a multimedia priority service (MPS) and a mission critical service (MCS)
901

Transmit a message (e.g., CONFIGURATION UPDATE COMMAND message, etc.) to dynamically update an indicator (e.g., MPS/MCS bit, etc.) on the wireless device indicating the wireless device has access to the service
902

*Fig. 9*

DYNAMIC MULTIMEDIA PRIORITY SERVICE (MPS) AND MISSION CRITICAL SERVICE (MCS) ACCESS IDENTITY SETTING

RELATED APPLICATION

The present application is a non-provisional application of and claims the benefit of U.S. Provisional Patent Application No. 63/243,523, filed Sep. 13, 2021, and entitled "Video Playback Buffer AdjustmentDyamic Multimedia Priority Service (MPS) and Mission Critical Service (MCS) Access Identity Setting", which is incorporated by reference in its entirety.

FIELD

This disclosure relates to the field of wireless communications, and more particularly to apparatus, systems, and methods for a wireless device to dynamically change MPS and MCS priority to allow users to make priority calls.

BACKGROUND

Fifth generation mobile network (5G) is a wireless standard that aims to improve upon data transmission speed, reliability, availability, and more. This standard, while still developing, includes numerous details relating to various aspects of wireless communication, for example, NR in a spectrum greater than 52.6 GHz.

SUMMARY

Methods and apparatuses for dynamically enabling and disabling one or more of a multimedia priority service (MPS) and a mission critical service (MCS) are disclosed. In some embodiments, a user equipment device (UE) comprises: at least one antenna; at least one radio coupled to the at least one antenna, wherein the at least one radio is configured to perform cellular communication; and one or more processors coupled to the at least one radio, wherein the one or more processors and the at least one radio are configured to dynamically enable and disable use of a service from a group of services that includes a MPS and MCS.

In some embodiments, a baseband processor is configured to perform operations comprising: determining to use a service from a group of services that includes MPS and MCS; and dynamically enabling and disabling use of the service.

In some embodiments, a method of wireless communication at a user equipment device (UE), comprising: determining to use a service from a group of services that includes MPS and MCS; and dynamically enabling and disabling use of the service.

BRIEF DESCRIPTION OF THE DRAWINGS

A better understanding of the present subject matter can be obtained when the following detailed description of various embodiments is considered in conjunction with the following drawings, in which:

FIG. 8 is a flow diagram of other embodiments of a process for a UE to dynamically enable and/or disable a multimedia priority service (MPS) and/or a mission critical service (MCS).

FIG. 9 is a flow diagram of some embodiments of a process for a network device to configure a wireless device to dynamically enable and/or disable a multimedia priority service (MPS) and/or a mission critical service (MCS).

DETAILED DESCRIPTION

Figure 1:
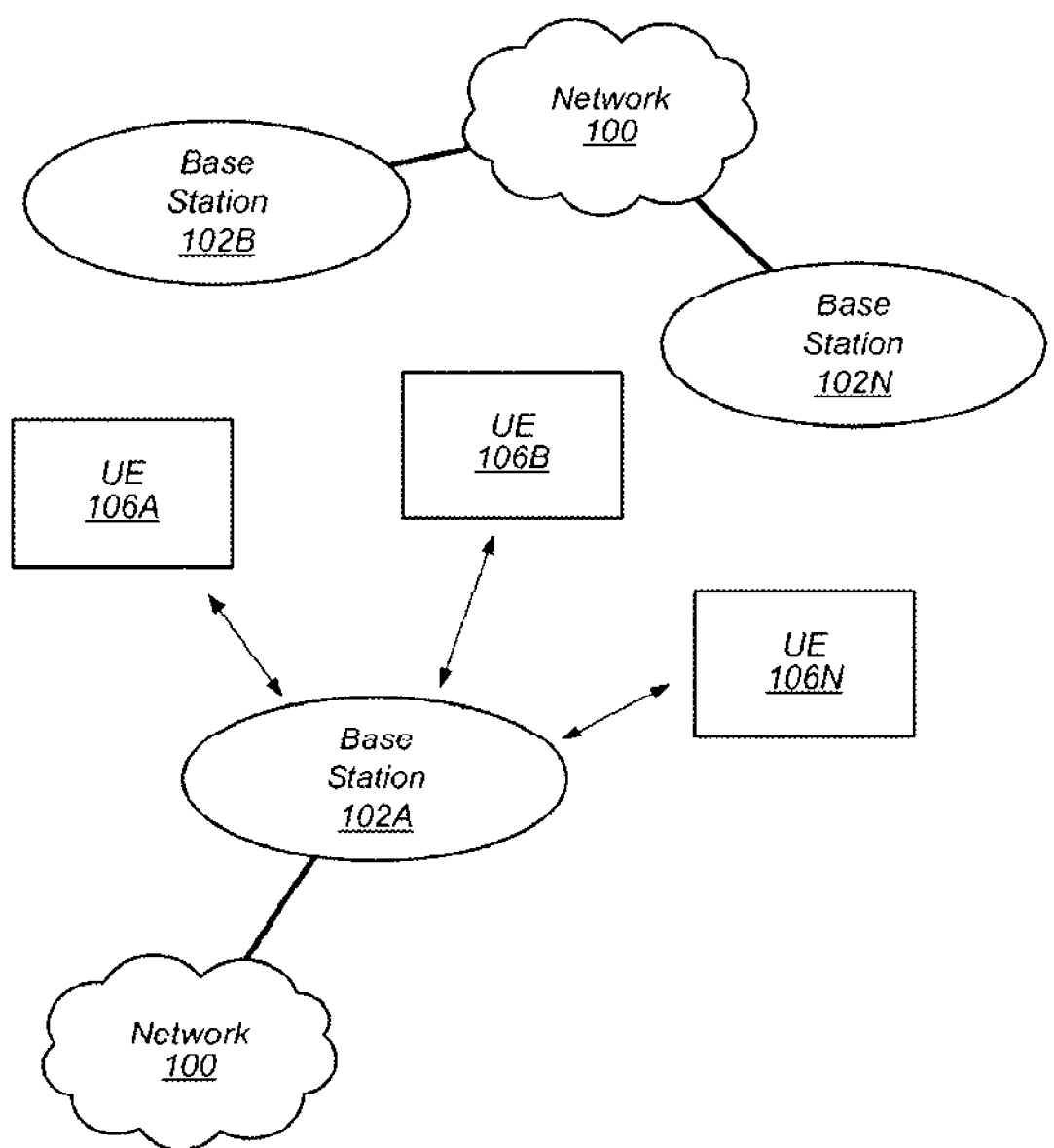
FIG. 1 illustrates an example wireless communication system according to some embodiments of the disclosure.

A method and apparatus for dynamically enabling and disabling one or more of a multimedia priority service (MPS) and a mission critical service (MCS) are disclosed. In some embodiments, the MPS or MCS is enabled and disabled dynamically on the fly. In some embodiments, the apparatus comprises a user equipment device (UE) or a baseband processor. In some embodiments, the MPS or MCS is enabled dynamically if the apparatus (e.g., UE, baseband processor, etc.) was previously configured for the service or if it's access identity indicator has been previously set (e.g., set to valid, a predetermined setting, etc.).

It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

Automatically-refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately-refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

A method and apparatus for dynamically enabling and disabling one or more of a multimedia priority service (MPS) and a mission critical service (MCS) are disclosed. In some embodiments, the MPS or MCS is enabled and disabled dynamically on the fly. In some embodiments, the apparatus comprises a user equipment device (UE) or a baseband processor. In some embodiments, the dynamically enabling or disabling use of MPS and/or MCS is performed using an ATtention (AT) command. In some embodiments, the AT command sets or reset access identity usage setting of the UE for a next monitoring occasion (MO) transaction.

In some embodiments, the MPS or MCS is enabled dynamically if the apparatus (e.g., UE, baseband processor, etc.) was previously configured to use the service or if it's access identity indicator has been previously set indicating access identity for the service is valid (e.g., Access identity 1 or 2 is valid, etc.). In some embodiments, the enabling disabling is performed without receiving a REGISTRA-TION-ACCEPT message or triggering a UE registration.

In some embodiments, the dynamically enabling or disabling use of MPS and/or MCS is made in response to a request from one or more upper layers. In some embodiments, the dynamically enabling or disabling use of MPS and/or MCS is made by initiating a trigger towards a Non-Access-Stratum (NAS) layer in baseband.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a 5G core (5GC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
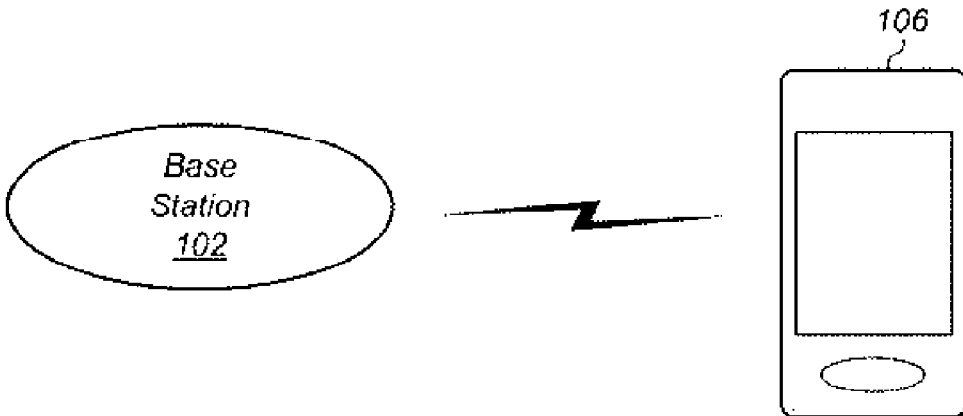
FIG. 2 illustrates a base station (BS) in communication with a user equipment (UE) device according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
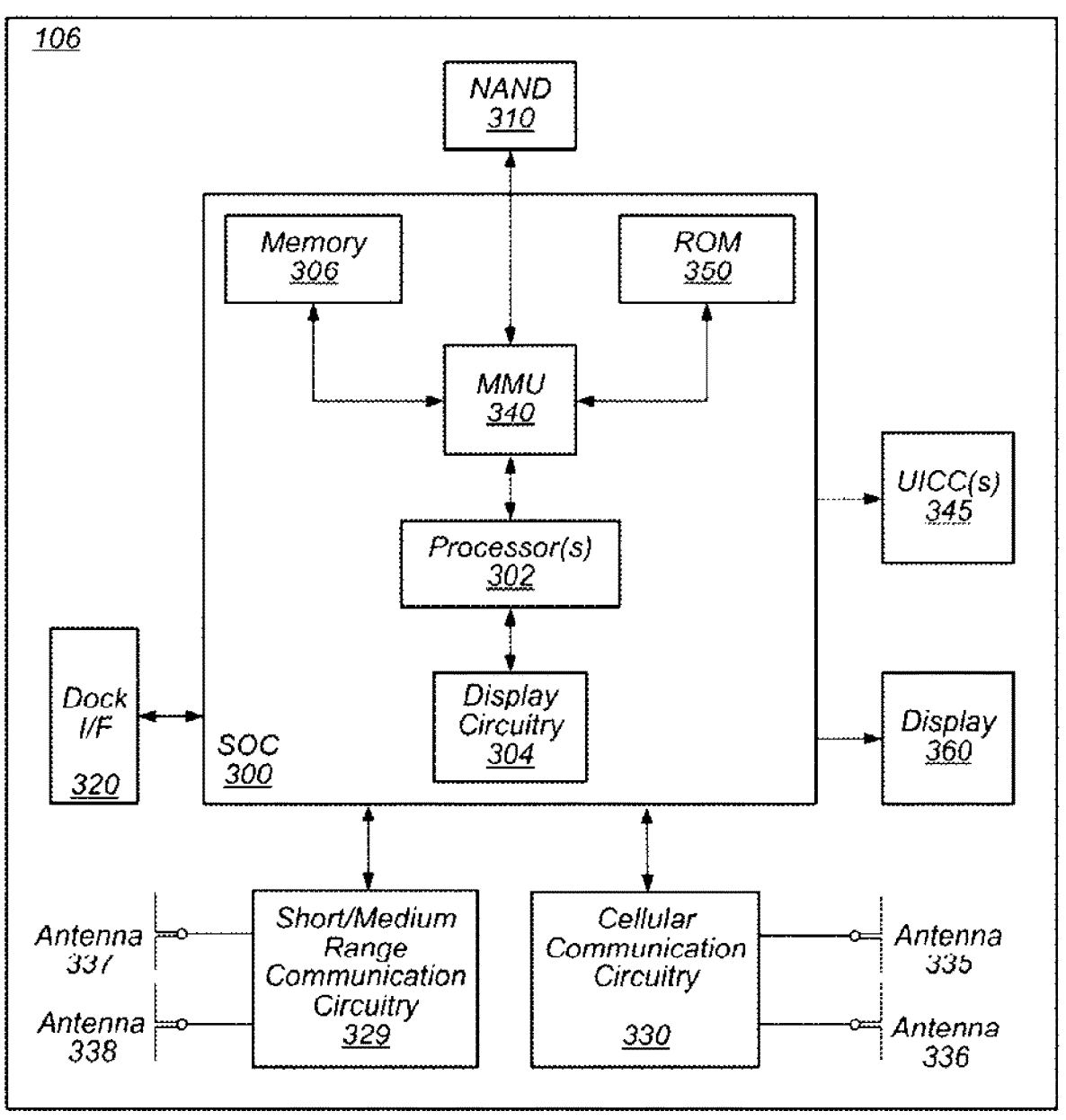
FIG. 3 illustrates an example block diagram of a UE according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to dynamically enable and/or disable MPS and/or MCS. In some embodiments, this occurs on the fly. In some embodiments, the dynamically enabling or disabling use of MPS and/or MCS is performed using an ATtention (AT) command that sets or resets access identity usage setting of the UE. In some embodiments, the MPS or MCS is enabled dynamically if the apparatus (e.g., UE, baseband processor, etc.) was previously configured to use the service or if it's access identity indicator has been previously set indicating access identity for the service is valid (e.g., Access identity 1 or 2 is valid, etc.). In some embodiments, the enabling disabling is performed without receiving a REGISTRATION-ACCEPT message or triggering a UE registration.

As described herein, the communication device 106 may include hardware and software components for implementing the above features for dynamically enabling and disabling one or more of a multimedia priority service (MPS) and a mission critical service (MCS). The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short-range wireless communication circuitry 329 may include one or more ICs that are configured to perform the functions of short-range wireless communication circuitry 32. In addition, each integrated circuit may include circuitry (e.g., first circuitry, second circuitry, etc.) configured to perform the functions of short-range wireless communication circuitry 329.

Figure 4:
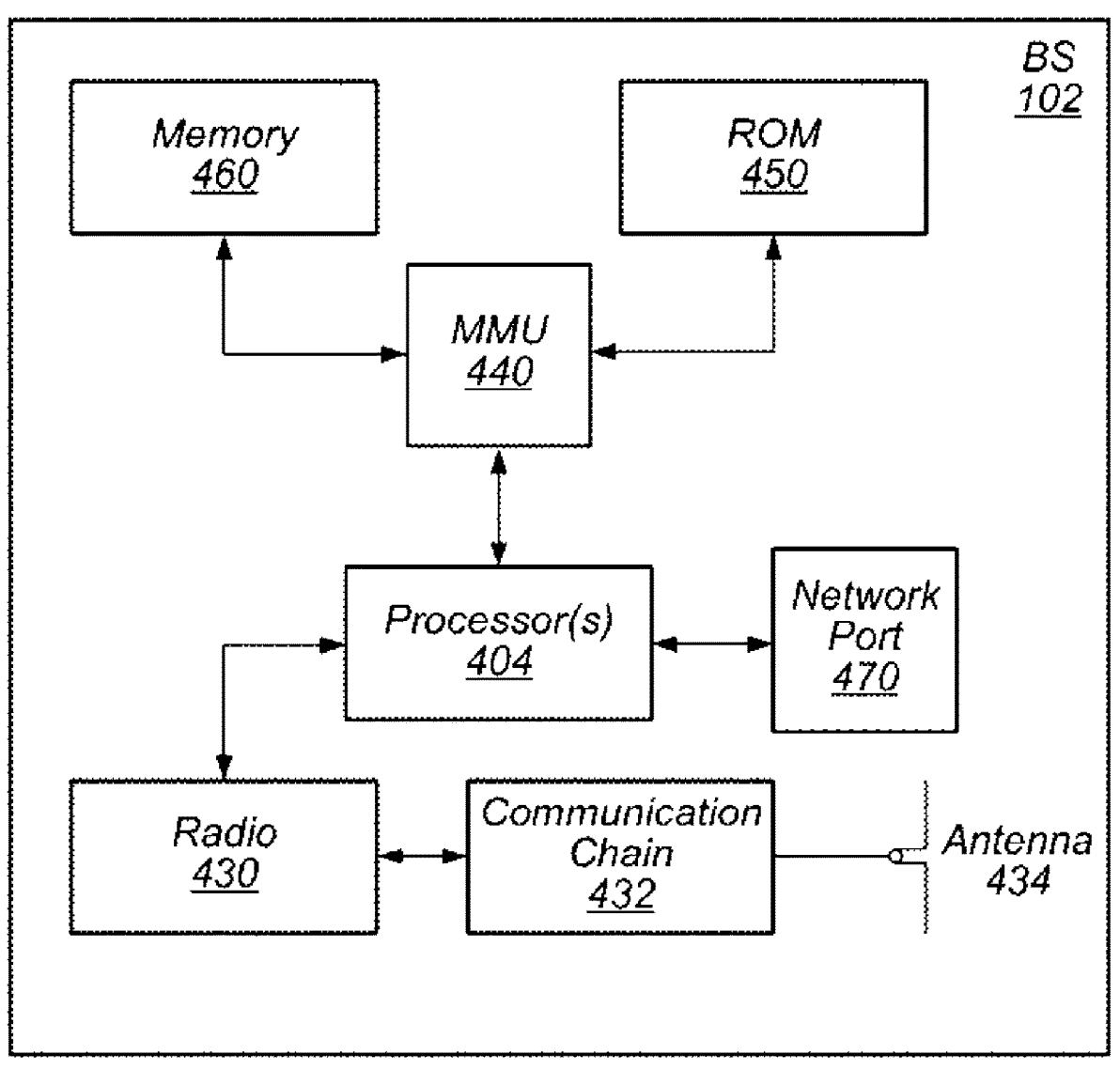
FIG. 4 illustrates an example block diagram of a BS according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a 5G core (5GC) network. In addition, base station 102 may be considered a 5G NR cell and may include one or more transition and reception points (TRPs).

In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.). As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
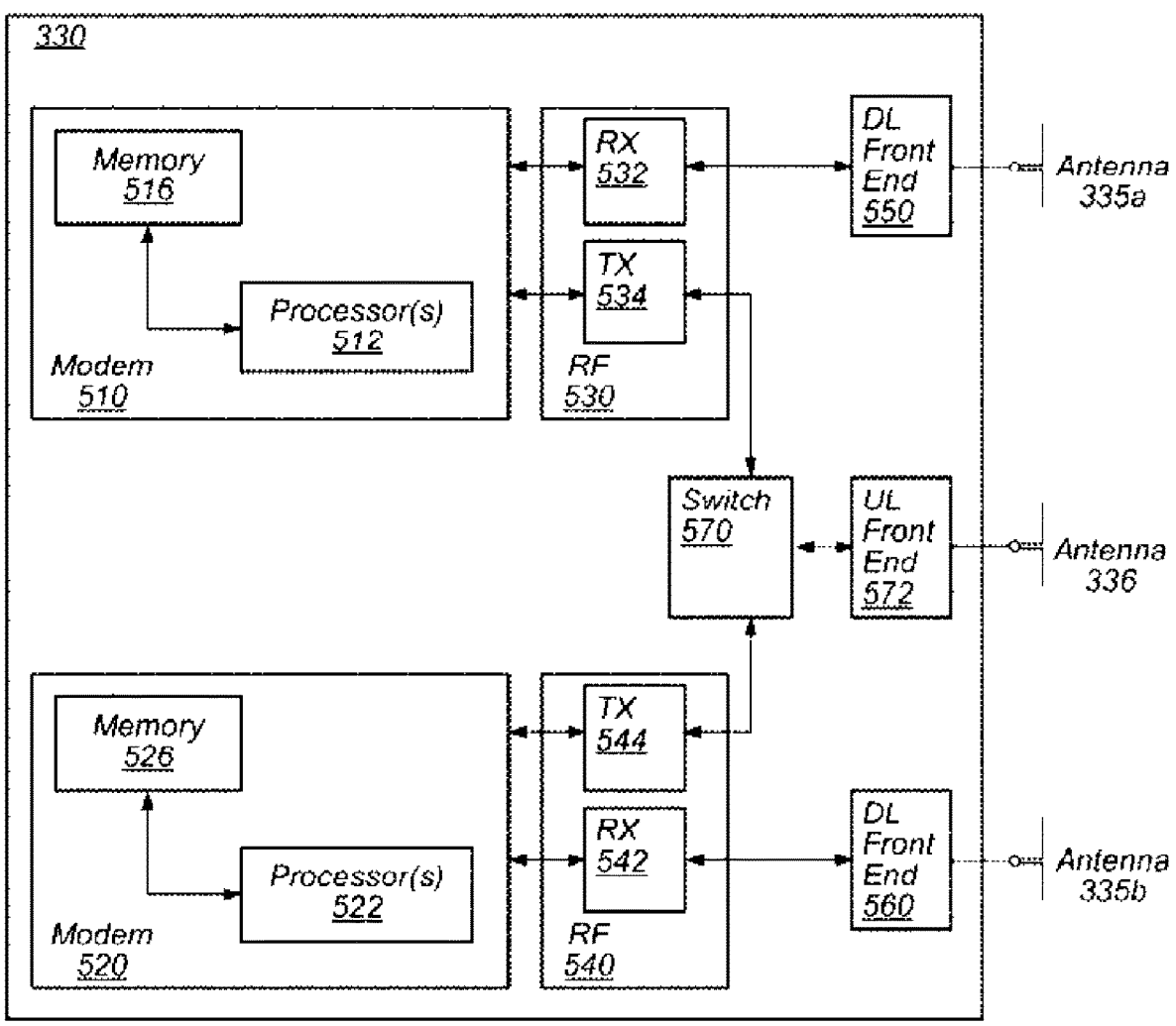
FIG. 5 illustrates an example block diagram of cellular communication circuitry according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Dynamic Multimedia Priority Service (MPS) and Mission Critical Service (MCS) Access Identity Setting Recently, 3GPP introduced Multimedia Priority Service (MPS) and mission critical service (MCS) features that allow selected users to make priority calls, thereby avoiding usual congestion/access barring situation in network. As per 3GPP stage-1(ST1)/stage-2(ST2) requirements, a user having MPS/MCS service should have a provision to decide to use this priority when a normal call fails. In the 3GPP stage-3 implementation, there does not appear to be any provision given to satisfy the above conditions at least when a call is initiated in 5GMM-IDLE state. However, there is a provision available once connection has been established at IMS (IP Multimedia Subsystems) level by indicating "Resource-Priority".

As part of the 5G standard, 3GPP does allow for the MPS/MCS priority to a user to be updated. However, updating the MPS/MCS priority to a user is allowed only through the use of a REGISTRATION-ACCEPT message that is part of the registration management procedure. Whenever such a change in MPS/MCS priority is made, Access & Mobility Management Function (AMF) has to wait for the UE to trigger registration. This is problematic in that as change in MPS/MCS is often time critical, and being dependent on UE registration for configuring this is not an efficient method in time critical situations.

Currently, as per the 3GPP specifications, the MPS/MCS priority for a UE can be configured through the following: USIM file "EFUAC-AIC" configured for access identity 1 or 2; or if there is change in information dynamically, AMF can send the UE the 5GS Network feature support IE with the MPS/MCS indicator bit set to "Access identity 1 or 2 valid" by using a REGISTRATION-ACCEPT message.

Unfortunately, once MPS/MCS is configured for the UE, all transactions triggered by UE will use MPS/MCS priority. That is, in 5G, there is no mechanism to change this priority dynamically. Therefore, a UE configured for using MPS/MCS priority will have all its calls made through the service even if such a call does not need to be made with priority.

Table 4.5.2.1 in TS 24.501 of the 3GPP specifications, an "Access identity" with a value 1 (which is a high priority access used for MPS) is valid when USIM file "EFUA-C_AIC" is configured for access identity 1 and the selected PLMN (Public Land Mobile Network), if a new PLMN is selected, or Registered Public Land Mobile Network (RPLMN) is the Home Public Land Mobile Network (HPLMN) (if the Equivalent HPLMN (EHPLMN) list is not present or is empty) or EHPLMN (if the EHPLMN list is present), a visited PLMN of the home country (see the definition of home country in 3GPP TS 24.301), OR the UE receives the 5GS Network feature support IE with the MPS indicator bit set to "Access identity 1 valid" from the RPLMN.

TABLE 1

| Current conditions for valid Access Identity 1 in 3GPP | | | |
|---|---|---|---|
| $EF_{UAC\_AIC}$ | MPS Indicator | HPLMN | Valid Access Id 1 |
| FALSE | FALSE | FALSE | FALSE |
| TRUE | FALSE | FALSE | FALSE |
| FALSE | TRUE | FALSE | TRUE |
| FALSE | FALSE | TRUE | FALSE |
| TRUE | FALSE | TRUE | TRUE |
| FALSE | TRUE | TRUE | TRUE |
| TRUE | TRUE | TRUE | TRUE |

Table 1 indicates all the conditions when access identity 1 is valid for a UE in current 3GPP specifications.

As mentioned above, the UE is required to provide a trigger in order to have valid Access identity 1.

Techniques are disclosed herein to dynamically change access to MPS and/or MCS. In some embodiments, the UE is already configured to utilize MPS and/or MCS and dynamically enables or disables its use. In one embodiment, this dynamic access is application-based in that its access is dynamically changed when an application wants to make a transaction (e.g., a call (e.g., MMTEL voice, video, SMS, data calls), etc.) on a priority basis.

In some embodiments, the UE uses a trigger towards non-access stratum (NAS) layer in baseband that can be used to invoke, modify, maintain and release MPS/MCS for baseband, so that the UE is provisioned to utilize priority access on an as-needed basis only, instead of using scarce priority network resource on non-priority transactions.

In some embodiments, dynamically enabling or disabling change access to MPS and/or MCS, and thus, dynamically enabling or disabling its use, is performed using an ATtention (AT) command, which when executed, sets or resets the Access identity 1 (for MPS) or 2 (for MCS). The service (e.g., MPS or MCS) is then used by the UE for next Mobile Originated (MO) transaction (e.g., the next call made by the UE). In some embodiments, the command to configure access identity is made by user/upper layers. In some embodiment, this command can be invoked if the UE is allowed to use MPS/MCS priority only when the priority access is available. In some embodiments, the UE is allowed to use MPS/MCS priority only when the priority access is available if its configured in USIM file named $EF_{UAC\_AIC}$ or an MPS/MCS indicator bit set to "Access identity 1 or 2 valid" in a REGISTRATION-ACCEPT message received by the UE, where Access identity 1 valid corresponds to enabling MPS and Access identity 2 valid corresponds to enabling MCS. Note that other indicators may be used in other contexts (e.g., other standards).

In some embodiments, the network changes UE access to MPS/MCS dynamically. In such a case, the network dynamically updates an MPS/MCS indicator (e.g., an MPS/MCS bit) using a message from the network. In some embodiments, the message is a CONFIGURATION UPDATE COMMAND message from the network via an Access & Mobility Management Function (AMF). In this way, time critical information can be shared with UE in a more efficient manner. In some embodiments, when this occurs, the UE receives a notification of the change to UE access priority when the MPS/MCS subscription has been activated (in the case of enabling the service) or deactivated (in the case of disabling the service) by the network. Note that when the UE decides to enable of disable use of the service, the UE generates a trigger using an ATtention (AT) command as described above.

In some embodiments, once user/upper layer notified about availability of access identity 1 (e.g., MPS), the user can initiate a trigger towards a NAS layer of baseband to indicate when user wants to utilize priority access for MPS (e.g., baseband to make Access identity 1 as valid). With user trigger option available, the UE can make Access identity 1 valid as is shown in Table 2 below.

TABLE 2 conditions for valid Access Identity 1

| User trigger for MPS | $EF_{UAC\_AIC}$ | MPS Indicator | HPLMN | Notify Access Id 1 availability |
|---|---|---|---|---|
| FALSE | FALSE | FALSE | FALSE | FALSE |
| FALSE | TRUE | FALSE | FALSE | FALSE |
| FALSE | FALSE | TRUE | FALSE | FALSE |
| FALSE | FALSE | FALSE | TRUE | FALSE |
| FALSE | TRUE | FALSE | TRUE | FALSE |
| FALSE | FALSE | TRUE | TRUE | FALSE |
| FALSE | TRUE | TRUE | TRUE | FALSE |
| TRUE | FALSE | FALSE | FALSE | FALSE |
| TRUE | TRUE | FALSE | FALSE | FALSE |
| TRUE | FALSE | TRUE | FALSE | TRUE |
| TRUE | FALSE | FALSE | TRUE | FALSE |
| TRUE | TRUE | FALSE | TRUE | TRUE |
| TRUE | FALSE | TRUE | TRUE | TRUE |
| TRUE | TRUE | TRUE | TRUE | TRUE |

As shown in Table 2, in some embodiments, a UE can dynamically trigger use when already configured to use MPS/MCS (e.g., via $EF_{UAC\_AIC}$ or an MPS indicator). In some embodiments, a UE can dynamically trigger use when already configured to use MPS/MCS (e.g., via $EF_{UAC\_AIC}$ or an MPS indicator) and upper layers (e.g., modem layers above L3 (e.g., AP, etc.). requested to use the priority service.

Figure 6:
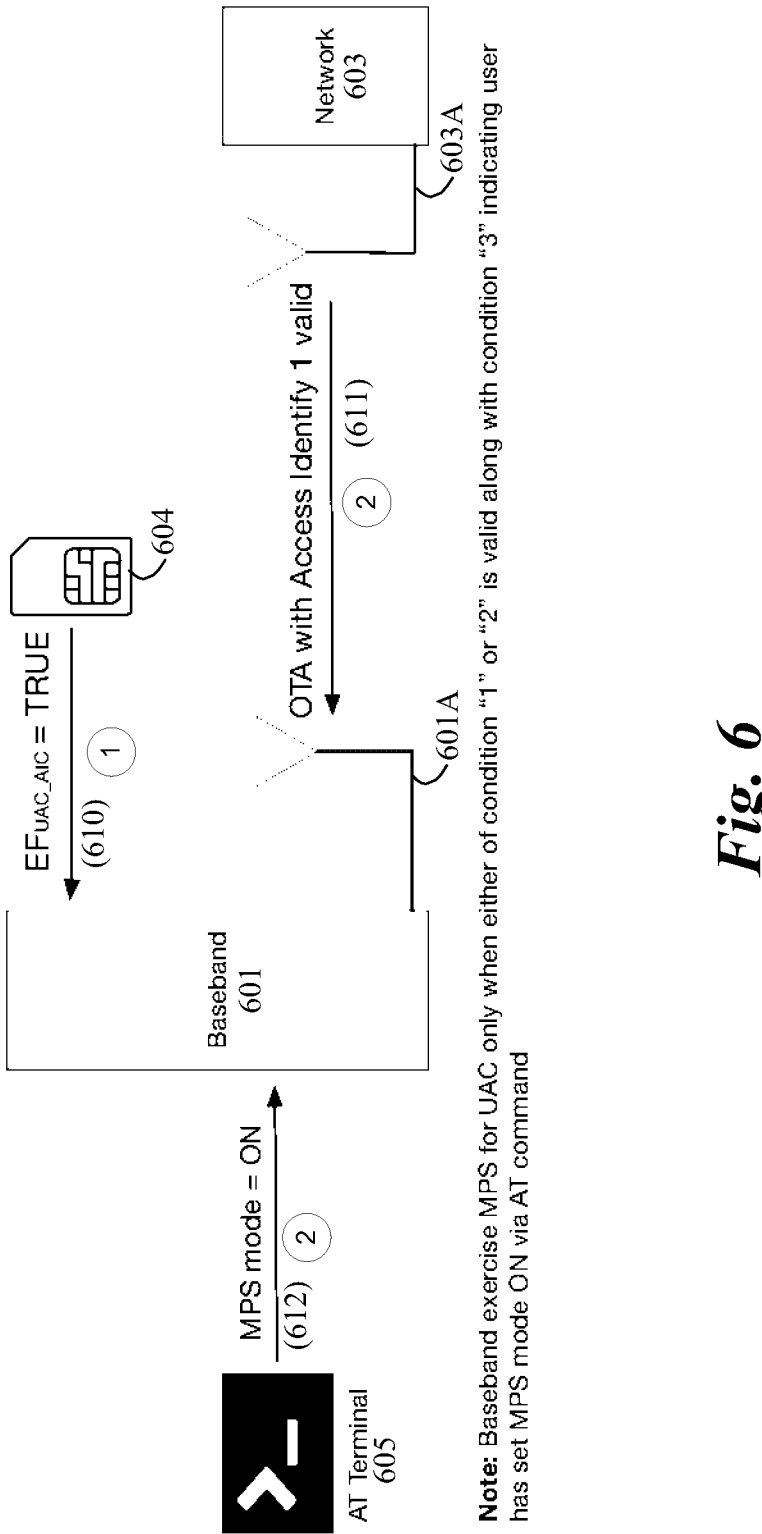
FIG. 6 illustrates the triggers that can used to determine access identity 1 valid in some embodiments.

FIG. 6 illustrates example triggers that can used to determine access identity 1 valid in some embodiments. In this case, the setting of user controlled MPS is performed by the UE by using an AT command. Referring to FIG. 6, a baseband processor 601 with an antenna 601A and SIM card 604. In some embodiments, SIM card 604 indicates that the UE is configured for MPS/MCS. This condition 610 may be indicated by $EF_{UAC\_AIC}$ being set to TRUE. Alternatively, or in addition, the network 603 with antenna 603A may send an over-the-air (OTA) command to baseband processor 601 of the UE, which baseband processor 601 receives with antenna 601A, that indicates the condition 611 that the Access Identity 1 (for MPS) or 2 (for MCS) is valid. Baseband processor 601 also receives a command (e.g., AT command) turning on the MPS (or MCS) mode from AT terminal 605 as condition 605. Thus, baseband processor 601 exercises MPS for UAC only when either condition 610 or 611 is valid along with condition 612 indicating user has set MPS mode ON via an AT command. In this manner, either of conditions 610 and 611 are pre-conditions to having a UE or baseband processor being enable to dynamically enable or disable MPS/MCS.

Figure 7:
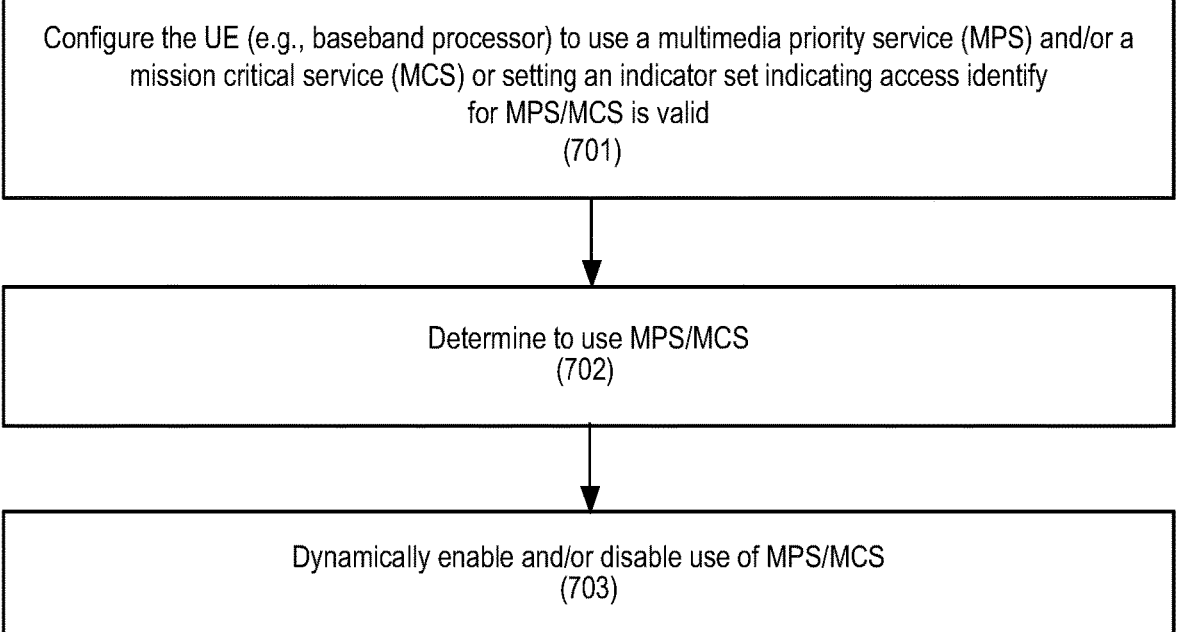
FIG. 7 is a flow diagram of some embodiments of a process for a UE to dynamically enable and/or disable a multimedia priority service (MPS) and/or a mission critical service (MCS).

FIG. 7 is a flow diagram of some embodiments of a process for a UE to dynamically enable and/or disable a multimedia priority service (MPS) and/or a mission critical service (MCS). The process is performed by processing logic that comprises hardware (circuitry, dedicated logic, etc.), software (e.g., software running on a chip, software run on a general-purpose computer system or a dedicated machine, etc.), firmware, or a combination of the three. In some embodiments, the operations in the process are performed by a UE operating according to 5G.

Referring to FIG. 7, the process begins by processing logic configuring the UE (e.g., baseband processor) to use a multimedia priority service (MPS) and/or a mission critical service (MCS) or setting an indicator set indicating access identity for MPS/MCS is valid (processing block 701). In some embodiments, dynamically updating an indicator indicating the baseband processor has access to the service, via an Access & Mobility Management Function (AMF), using a configuration update command.

Subsequently, processing logic determines to use MPS and/or MCS (processing block 702) and then dynamically enables and/or disables use of MPS and/or MCS (processing block 703). In some embodiments, dynamically enabling and disabling use of the service occurs without performing a registration-accept or triggering a UE registration. In some embodiments, dynamically enabling and disabling use of the service comprises performing an ATtention (AT) command. In some embodiments, AT command sets or reset access identity usage setting of the UE for a next Mobile Originated (MO) transaction.

In some embodiments, dynamically enabling and disabling use of the service occurs in response to a request from one or more upper layers. In some embodiments, dynamically enabling and disabling use of the service comprises initiating a trigger towards a Non-Access-Stratum (NAS) layer in baseband.

FIG. 8 is a flow diagram of some embodiments of a process for a UE to dynamically enable and/or disable a multimedia priority service (MPS) and/or a mission critical service (MCS). The process is performed by processing logic that comprises hardware (circuitry, dedicated logic, etc.), software (e.g., software running on a chip, software run on a general-purpose computer system or a dedicated machine, etc.), firmware, or a combination of the three. In some embodiments, the operations in the process are performed by a UE operating according to 5G.

Referring to FIG. 8, the process begins by processing logic receiving a command from a network (processing block 801). In some embodiments, the command comprises a configuration update command received from the network via an Access & Mobility Management Function (AMF).

In response to the command, processing logic dynamically updates an indicator (e.g., a MPS/MCS bit) that indicates that the UE has access to the service in response to receiving a command from a network (processing block 802). The indicator may be updated to indicate the service is enabled or disabled.

Processing logic also generates a notification to the user that indicates subscription to the service has been activated (in the case of enabling the service) or deactivated (in the case of disabling the service) (processing block 803).

Subsequently, processing logic determines to use MPS and/or MCS (processing block 804) and then dynamically enables and/or disables use of MPS and/or MCS (processing block 805). In some embodiments, dynamically enabling and disabling use of the service occurs without performing a registration-accept or triggering a UE registration. In some embodiments, dynamically enabling and disabling use of the service comprises generating a trigger to use the service. In some embodiments, the trigger is generated by performing an ATtention (AT) command. In some embodiments, AT command sets or reset access identity usage setting of the UE for a next Mobile Originated (MO) transaction.

In some embodiments, dynamically enabling and disabling use of the service occurs in response to a request from one or more upper application layers. In some embodiments, dynamically enabling and disabling use of the service comprises initiating a trigger towards a Non-Access-Stratum (NAS) layer in baseband.

FIG. 9 is a flow diagram of some embodiments of a process for a network device to configure a wireless device to dynamically enable and/or disable a multimedia priority service (MPS) and/or a mission critical service (MCS). The process is performed by processing logic that comprises hardware (circuitry, dedicated logic, etc.), software (e.g., software running on a chip, software run on a general-purpose computer system or a dedicated machine, etc.), firmware, or a combination of the three. In some embodiments, the operations in the process are performed by a base station or other network entity operating according to 5G.

Referring to FIG. 9, the process begins by processing logic determining a configuration for a wireless device, wherein the configuration indicates that the wireless device is to have access to a service from a group of services that includes a multimedia priority service (MPS) and a mission critical service (MCS) (processing block 901). In some embodiments, the wireless device comprises a user equipment device (UE). In some embodiments, the wireless device comprises a baseband processor.

After determining the configuration of the wireless device, processing logic transmits a message to dynamically update an indicator on the wireless device indicating the wireless device has access to the service (processing block 902). In some embodiments, the message comprises a CONFIGURATION UPDATE COMMAND message and is transmitted via an Access & Mobility Management Function (AMF). In some embodiments, the indicator is an MPS/MCS bit.

There are a number of example embodiments described herein.

Example 1 is baseband processor configured to perform operations comprising: determining to use a service from a group of services that includes a multimedia priority service (MPS) and a mission critical service (MCS); and dynamically enabling and disabling use of the service.

Example 2 is the baseband processor of example 1 that may optionally include that dynamically enabling and disabling use of the service comprises performing an ATtention (AT) command.

Example 3 is the baseband processor of example 2 that may optionally include that the operations further comprise, prior to performing the AT command, configuring baseband to use the service or setting an indicator set indicating access identity for the service is valid.

Example 4 is the baseband processor of example 2 that may optionally include that the AT command sets or reset access identity usage setting of the UE for a next Mobile Originated (MO) transaction.

Example 5 is the baseband processor of example 1 that may optionally include that dynamically enabling and disabling use of the service occurs in response to a request from one or more upper layers.

Example 6 is the baseband processor of example 1 that may optionally include that dynamically enabling and disabling use of the service comprises initiating a trigger towards a Non-Access-Stratum (NAS) layer in baseband.

Example 7 is the baseband processor of example 1 that may optionally include that dynamically enabling and disabling use of the service occurs without receiving a REGISTRATION ACCEPT message or triggering a UE registration.

Example 8 is the baseband processor of example 1 that may optionally include that the one or more processors dynamically update an indicator indicating the UE has access to the service in response to receiving, via the at least one antenna and at least one radio, a message from a network, and further wherein the one or more processors generate a notification for the user indicating subscription to the service has been activated in the case of enabling the service or deactivated in the case of disabling the service.

Example 9 is the baseband processor of example 8 that may optionally include that the message comprises a CONFIGURATION UPDATE COMMAND message received from the network via an Access & Mobility Management Function (AMF).

Example 10 is the baseband processor of example 8 that may optionally include that the one or more processors trigger dynamically enable or disable use of the service using an ATtention (AT) command after the indicator has been updated.

Example 11 is a method of wireless communication at a user equipment device (UE), comprising: determining to use a service from a group of services that includes a multimedia priority service (MPS) and a mission critical service (MCS); and dynamically enabling and disabling use of the service.

Example 12 is the method of example 11 that may optionally include that dynamically enabling and disabling use of the service comprises performing an ATtention (AT) command.

Example 13 is the method of example 12 that may optionally include, prior to performing the AT command, configuring baseband to use the service or setting an indicator set indicating access identity for the service is valid.

Example 14 is the method of example 12 that may optionally include that the AT command sets or reset access identity usage setting of the UE for a next Mobile Originated (MO) transaction.

Example 15 is the method of example 11 that may optionally include that dynamically enabling and disabling use of the service occurs in response to a request from one or more upper layers.

Example 16 is the method of example 11 that may optionally include that dynamically enabling and disabling use of the service comprises initiating a trigger towards a Non-Access-Stratum (NAS) layer in baseband.

Example 17 is the method of example 11 that may optionally include that dynamically enabling and disabling use of the service occurs without receiving a REGISTRATION ACCEPT message or triggering a UE registration.

Example 18 is the method of example 11 that may optionally include dynamically updating an indicator indicating the UE has access to the service in response to receiving a message from a network and generating a notification for the user indicating subscription to the service has been activated in the case of enabling the service or deactivated in the case of disabling the service.

Example 19 is the method of example 18 that may optionally include that the message comprises a CONFIGURATION UPDATE COMMAND message received from the network via an Access & Mobility Management Function (AMF).

Example 20 is the method of example 18 that may optionally include that determining to use a service further comprising generating a trigger to dynamically enable or disable use of the service using an ATtention (AT) command after the indicator has been updated.

Example 21 is a user equipment device (UE), comprising: at least one antenna; at least one radio coupled to the at least one antenna, wherein the at least one radio is configured to perform cellular communication; and one or more processors coupled to the at least one radio, wherein the one or more processors and the at least one radio are configured to determine whether to use a service from a group of services that includes a multimedia priority service (MPS) and a mission critical service (MCS) and dynamically enable and disable use of a service from a group of services that includes a multimedia priority service (MPS) and a mission critical service (MCS).

Example 22 is the UE of example 21 that may optionally include that the one or more processors dynamically enable or disable use of the service using an ATtention (AT) command.

Example 23 is the UE of example 22 that may optionally include that, prior to use of the AT command, the UE is configured to use the service or has an indicator set indicating access identity for the service is valid.

Example 24 is the UE of example 22 that may optionally include that the AT command sets or reset access identity usage setting of the UE for a next Mobile Originated (MO) transaction.

Example 25 is the UE of example 21 that may optionally include that the one or more processors dynamically enable or disable use of the service in response to a request from one or more upper layers.

Example 26 is the UE of example 21 that may optionally include that the one or more processors dynamically enable or disable use of the service by initiating a trigger towards a Non-Access-Stratum (NAS) layer in baseband.

Example 27 is the UE of example 21 that may optionally include that the one or more processors dynamically enable or disable use of the service without receiving a REGISTRATION ACCEPT message or triggering a UE registration.

Example 28 is the UE of example 21 that may optionally include that the one or more processors dynamically update an indicator indicating the UE has access to the service in response to receiving, via the at least one antenna and at least one radio, a message from a network, and further wherein the one or more processors generate a notification for the user indicating subscription to the service has been activated in the case of enabling the service or deactivated in the case of disabling the service.

Example 29 is the UE of example 28 that may optionally include that the message comprises a CONFIGURATION UPDATE COMMAND message received from the network via an Access & Mobility Management Function (AMF).

Example 30 is the UE of example 28 that may optionally include that the one or more processors trigger dynamically enable or disable use of the service using an ATtention (AT) command after the indicator has been updated.

Example 31 is a network device comprising a processor configured to perform operations comprising: determining a configuration for a wireless device, wherein the configuration indicates that the wireless device is to have access to a service from a group of services that includes a multimedia priority service (MPS) and a mission critical service (MCS); and transmitting a message to dynamically update an indicator on the wireless device indicating the wireless device has access to the service.

Example 32 is the network device of example 31 that may optionally include that the message comprises a CONFIGURATION UPDATE COMMAND message.

Example 33 is the network device of example 31 that may optionally include that transmitting the message is performed via an Access & Mobility Management Function (AMF).

Example 34 is the network device of example 31 that may optionally include that the wireless device comprises a user equipment device (UE).

Example 35 is the network device of example 31 that may optionally include that the wireless device comprises a baseband processor.

Example 36 is the network device of example 31 that may optionally include that the indicator is a MPS or MCS bit.

Example 37 is a method performed by a network device comprising determining a configuration for a wireless device, wherein the configuration indicates that the wireless device is to have access to a service from a group of services that includes a multimedia priority service (MPS) and a mission critical service (MCS); and transmitting a message to dynamically update an indicator on the wireless device indicating the wireless device has access to the service.

Example 38 is the method of example 37 that may optionally include that the message comprises a CONFIGURATION UPDATE COMMAND message.

Example 39 is the method of example 37 that may optionally include that transmitting the message is performed via an Access & Mobility Management Function (AMF).

Example 40 is the method of example 37 that may optionally include that the wireless device comprises a user equipment device (UE).

Example 41 is the method of example 37 that may optionally include that the wireless device comprises a baseband processor.

Example 42 is the method of example 37 that may optionally include that the indicator is a MPS or MCS bit.

Example 43 is one or more non-transitory computer readable storage media having instructions stored therein which, when executed by one or more processors of a UE, cause the UE to perform operations comprising one or more of the methods of examples 11-20.

Example 44 is one or more non-transitory computer readable storage media having instructions stored therein which, when executed by one or more processors of a UE, cause the UE to perform operations comprising one or more of the methods of examples 37-42.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor configured to perform operations comprising:

determining to use a service from a group of services that includes a multimedia priority service (MPS) and a mission critical service (MCS);

dynamically updating an indicator indicating a user equipment (UE) has access to the service in response to receiving, via at least one antenna and at least one radio, a message from a network;

generating a notification for a user indicating subscription to the service has been activated in a case of enabling the service or deactivated in a case of disabling the service;

determining to use MPS or MCS or both MPS and MCS and dynamically enabling and disabling use of the MPS or MCS or both MPS and MCS, wherein dynamically enabling and disabling use of the service occurs without receiving a REGISTRATION ACCEPT message or triggering UE registration.

2. The baseband processor of claim 1 wherein dynamically enabling and disabling use of the service comprises performing an ATtention (AT) command.

3. The baseband processor of claim 2 wherein the operations further comprise, prior to performing the AT command, configuring baseband to use the service or setting an indicator set indicating access identity for the service is valid.

4. The baseband processor of claim 2 wherein the AT command sets or reset access identity usage setting of the UE for a next Mobile Originated (MO) transaction.

5. The baseband processor of claim 1 wherein dynamically enabling and disabling use of the service occurs in response to a request from one or more upper layers.

6. The baseband processor of claim 1 wherein dynamically enabling and disabling use of the service comprises initiating a trigger towards a Non-Access-Stratum (NAS) layer in baseband.

7. The baseband processor of claim 1 wherein the message comprises a CONFIGURATION UPDATE COMMAND message received from the network via an Access & Mobility Management Function (AMF).

8. The baseband processor of claim 1 wherein the operations further comprise dynamically triggering enable or disable use of the service using an ATtention (AT) command after the indicator has been updated.

9. A method of wireless communication at a user equipment device (UE), comprising:

determining to use a service from a group of services that includes a multimedia priority service (MPS) and a mission critical service (MCS);

dynamically updating an indicator indicating the UE has access to the service in response to receiving, via at least one antenna and at least one radio, a message from a network;

generating a notification for a user indicating subscription to the service has been activated in the case of enabling the service or deactivated in the case of disabling the service;

determining to use MPS or MCS or both MPS and MCS and dynamically enabling and disabling use of the MPS or MCS or both MPS and MCS, wherein dynamically enabling and disabling use of the service occurs without receiving a REGISTRATION ACCEPT message or triggering a UE registration.

10. The method of claim 9 wherein dynamically enabling and disabling use of the service comprises performing an ATtention (AT) command.

11. The method of claim 10 further comprising, prior to performing the AT command, configuring baseband to use the service or setting an indicator set indicating access identity for the service is valid, wherein the AT command sets or reset access identity usage setting of the UE for a next Mobile Originated (MO) transaction.

12. The method of claim 9 wherein dynamically enabling and disabling use of the service occurs in response to a request from one or more upper layers.

13. The method of claim 9 wherein dynamically enabling and disabling use of the service comprises initiating a trigger towards a Non-Access-Stratum (NAS) layer in baseband.

14. A network device comprising a processor configured to perform operations comprising:

determining a configuration for a wireless device, the configuration indicate that the wireless device is to have access to a service from a group of services that includes a multimedia priority service (MPS) and a mission critical service (MCS);

dynamically updating an indicator indicating a user equipment (UE) has access to the service in response to receiving, via at least one antenna and at least one radio, a message from a network;

generating a notification for the user indicating subscription to the service has been activated in the case of enabling the service or deactivated in the case of disabling the service;

determining the use of MPS or MCS or both MPS and MCS and dynamically enabling and disabling use of the MPS or MCS or both MPS and MCS, transmitting a message to dynamically update an indicator on the wireless device indicating the wireless device has access to the service, wherein dynamically updating the indicator occurs without receiving a REGISTRATION ACCEPT message or triggering a UE registration.

15. The network device of claim 14 wherein the message comprises a CONFIGURATION UPDATE COMMAND message.

16. The network device of claim 14 wherein transmitting the message is performed via an Access & Mobility Management Function (AMF).

* * * * *